Patented Aug. 13, 1935

2,011,020

UNITED STATES PATENT OFFICE 2,011,020

PROCESS OF CANNING PINEAPPLES AND SIMILAR PRODUCTS

Robert Brooks Taylor, Kapaa, Territory of Hawaii, assignor to Hawaiian Canneries Company, Ltd., Kapaa, Kauai, Hawaii, a corporation of Hawaii No Drawing. Application January 12, 1932, Serial No. 586,230

3 Claims. (Cl. 99—8)

The present invention relates to improvements in a process of canning pineapple and other food products, and the principal object of the invention is to provide a new process which not only very much simplifies canning operations, but which also results in a better and a more marketable product. While this invention will be described in connection with the canning of pineapples, it should be understood that the same process may be applied, possibly with some variations and modifications, to different kinds of fruits, vegetables, berries, and canned products.

The present application is a continuation in part of my Patent No. 1,964,143, issued June 26, 1934, on a pressure process for canning pineapple. Since filing the latter application I have made further important discoveries in connection with the details for carrying out the broad principle of the process described in the pending application.

Prior to my invention the operation of canning pineapple was carried out in the largest pineapple canning plant in Hawaii in substantially the following manner:

The pineapple was sliced and put in the cans, either in full slices or in slices having the core removed. The cans were next subjected to what is known as the vacuumizing process. The purpose of this process is to improve the appearance of the pineapple slices. Pineapple as has been stated in the pending application is a collection of small fruits and the bottom of the general cluster of the general fruit ripens prior to the fruit at the top of the pineapple. Thus the pineapple is usually ripe at the bottom and not sufficiently ripe at the top, or slightly overripe at the bottom and properly ripe at the top. The slices obtained from pineapple show more or less light spots of fibers, and these are objectionable to the customers. To overcome this feature the pineapple is subjected to a partial vacuum which is almost immediately released so that the pineapple comes again into the normal pressure of the air. This process tends to make the slices more uniform in color. This is due to the fact that when the pineapple slices are subjected to a partial vacuum the air pressure inside which is equal to the atmospheric pressure, forces its way out of the slices and that immediately thereafter, the vacuum being broken, the air tries to get back into the slices of pineapple. Thus there is a slight expanding and disrupting effect similar to that in puffing rice, as the vacuum is quickly applied and immediately relieved whereby a slight compression of the slices takes place, due to the increased pressure of the air over that which is now inside the slices.

After the vacuumizing it was customary to add a solution of pineapple juice and sugar, or water and sugar, and the product was then passed through an exhaust box or previous heating device where the temperature was raised under a vacuum to about 165 deg. F. The object of this operation was to drive out the air and to produce a moisture vapor which condenses after the can is closed, and creates a partial vacuum in the can. At the end of this operation the top of the can was sealed or seamed to the body thereof.

Next the closed or sealed can would go through a process of sterilization and cooking well known in the art.

It will be seen that in the above process there were, apart from the filling and syruping operations, three different steps, namely the vacuumizing, the exhausting and the sterilizing steps.

In my invention I provide a radical departure from this conventional procedure which not only reduces these three steps to a single step, but which also produces a better product of better appearance, and which furthermore effects a considerable saving in floor space and operating costs.

Probably the most important part of my invention is the discovery that the vacuumizing operation may be carried out to better advantage if pressure is applied to the pineapple instead of or along with a vacuum. This discovery offers two principal advantages. In the first place it allows a greater differential in pressure to be used which will be readily understood from the following deductions. In the vacuumizing process alone the greatest differential in pressure which can be obtained is the difference between the greatest vacuum obtainable, and the atmospheric pressure which could not exceed 14.7 pounds per square inch, even theoretically under normal conditions. Since this vacuum is applied only for a second or two and then immediately released, it will be seen that the greatest differential that might be expected will be only, as a matter of fact, perhaps one or two pounds per square inch. In any case it will be only a small fraction of the barometric pressure of the air at the point where the pineapple is canned.

In my process I propose to apply pressure to the pineapple which may or may not have been subjected to a vacuum, and then release the pressure to ordinary atmospheric pressure. By this process it is possible to obtain a very great differential in pressure depending entirely upon the amount of the original and the applied pressure. It is even theoretically possible that a high pressure, hundreds or even thousands of pounds per square inch, would still function in this process. It need not necessarily be air pressure, as it can be a pressure in water or some other fluid not objectionable to the product. By applying a pressure, and then releasing this pressure the differential, instead of being a fraction of the atmospheric pressure, will be many times that figure.

The second advantage obtained by the use of pressure instead of, or in connection with, a vacuum is the great simplification in the process, since the use of pressure for effecting the desired result allows the entire procedure to be radically reorganized and allows the three steps heretofore mentioned, namely the vacuumizing, the exhausting and the sterilizing, to be carried out in a single operation in which the pineapple, while in the open can, is subjected to a high pressure at high temperatures, the single process taking care of the sterilizing and cooking, while the release of the pressure and the return of the fruit to normal temperature performs the function of both the vacuumizing process and the exhaust process.

Referring now to the process in detail, it is preferably carried out in the following manner: The machinery necessary for my process is almost conventional in character and does not form a part of the present application. I use what might be termed a pressure cooker of substantially conventional character with suitable intake and outlet valves. The principal difference between the pressure cooker employed by me, and those in use heretofore is as follows: The conventional cooker consisting of a large cylinder with means therein for continuously advancing cans therethrough is disposed in a horizontal position, the cans which in the conventional process are sealed at that time being allowed to roll through the cooker in a spiral path. For my process the cans are advanced through the pressure cooker while open, and it is necessary therefore that the cans maintain an upright position. To take care of this requirement I merely change the conventional order by setting the cylinder on end and allowing the cans containing the pineapple to pass through the same in a spiral path from top to bottom while maintaining their vertical position. It is also necessary for the purposes of my invention to provide suitable intake and outlet valves for the cans which differ somewhat from the intake and outlet valves previously employed. The differences necessitated in these valves will be pointed out in connection with the description of the process.

The open cans containing the pineapple enter the cooker through a valve disposed near the top of the same. The cooker contains a pressure of steam or air, or water at any suitable figure up to about fifty pounds per square inch, which in a case where steam is used, is equivalent to a temperature of 297 deg. F. It should be understood that the temperatures and pressures as well as the media used in my process, will be governed by the nature of the product under consideration. I find that a temperature above 297 deg. F. and a pressure above fifty pounds per square inch is unnecessary and rather costly, although it is conceivable that a temperature much higher than this might be satisfactory for vegetables which ordinarily require a longer cook.

It should be observed at this point that the difference in pressure and temperature between that on the outside of the cooker which may be taken to be 80 deg. F. at normal atmospheric pressure and that prevailing on the inside of the cooker is very pronounced, and I find that for best results, to prevent injury to the pineapple, as well as collapse of the can by the sudden increase in pressure, it is advisable to step up the pressure gradually. I therefore prefer to use a valve which is constructed in such a manner that the pressure may be step-wise increased from atmospheric pressure to that prevailing within the cooker. It may be desirable, under certain conditions, particularly where the process is applied to crushed pineapple or to pineapple from which the core has not been removed, to first apply vacuum to the fruit and to then step up the pressure to that prevailing within the can to insure more rapid penetration and a greater differential in pressure.

After entering the cooker the can passes through the same in its tortuous path and remains in the cooker preferably for a period of eight minutes. It should be understood, of course, that the time period depends upon the degree of pressure and heat applied and that I do not wish to confine myself to any particular figures since it will be easy for the operator to establish for himself the best conditions under which the process may be carried out.

When the can enters the cooker, the can which at that time still has substantially the temperature of the atmosphere, becomes immediately a condenser for the hot steam within the cooker and the water resulting from the condensation fills the can. If water is used in the cooker instead of steam the can becomes immersed in water immediately. If air is used condensation does not take place and the temperatures must be watched carefully to avoid burning.

Instead of relying on products of condensation to fill the cans with water after entry into the cooker and particularly in cases where dry air is used in the cooker, I find it desirable to fill the interstices between individual pieces of the product with water so that the container enters into the cooker filled with pure water whereby the condensation of steam on the product is avoided and the product is protected from the initial high temperature of the steam or heated air as it enters the cooker. In cases where water is used as a medium of transferring the heat into the container so that it will be immersed in water in its entirety as it passes through the chamber, the application of water to the cans prior to their entry into the cooker is less desirable.

The preliminary filling of the can with water over and above the amount of space occupied by the product already in the can, eliminates the tendency of the product to burn upon entering the steam pressure at a high temperature.

While passing through the cooker the fruit gradually acquires a temperature approaching that prevailing within the cooker, and when it is ready to leave the cooker, its temperature is higher than the normal boiling point of water at 760 mm. pressure, so that the water which is in the can will vaporize almost immediately on its emission from the machine.

Here again care must be exercised to prevent explosive action due to too sudden drop in pressure. I prefer again to step down the pressure by stages and provision is made for this in the construction of the outlet valve which is made to reduce the pressure in several steps. When I refer to stepwise reduction in pressure, I do not mean that an extended time period is necessary for reducing the pressure, but only that the reduction is not to be instantaneous. I find from my present experiments that about 1 to 1½ seconds are sufficient for the proper stepwise reduction. Since the water emanates from the cooker at a temperature about 212 deg. F. the entire amount of water evaporates, or is driven off mechanically by said evaporation, immediately upon reduction in pressure so that practically all the water disappears. The presence of the water in the cans or containers is a distinct advantage as it prevents burning of the product and by convection currents transmits the heat into the entire confines of the can. Nothing appreciable is lost when the can emerges from the machine and the evaporation of the water is complete. Syruping now takes place in the conventional manner, and the cans are then sealed immediately. The syrup is preferably added after the same has been heated and exhausted, and for this purpose I preferably use the exhaust steam from the intake and outlet valves.

I find that the slices of pineapple are improved so materially by this process that the white spots which are an objection in pineapples have been rendered relatively translucent, and have been practically eliminated from view by the application and release of the pressure. I have found that this pressure, applied during the process, improves the tenderness and quality of the various items that have been tried up to date. The tendency of the water on the inside of the product, which has been forced in by the pressure or the native moisture therein, to expand quickly into steam on emerging, serves to render it more tender much as the action of puffing of rice and wheat now on the market.

It should be understood that the expansion of the water turning into steam within the meat of the pineapple is made to take place by degrees, and that care must be taken to avoid what might be termed explosive violence such as is responsible for the puffing of rice, for instance.

The above process has been successfully demonstrated and carried out in one of the most complete canning plants in the world, and has resulted not only in a superior product, but also has been responsible for the elimination of much machinery and also in the saving of floor space, due to the fact that the position of the long cylindrical cooker has been changed from horizontal to vertical.

When referring to cans in the above description I mean to cover any suitable container that may be sealed and put on the market, as distinguished from the cooker or steam chamber itself. In other words, I have in view containers in which the entire product may be handled as separated units which may be passed through the chamber or pressure cooker without having their contents necessarily agitated or essentially disturbed.

Where the term cooking is used in the claims it should be understood that this term is not necessarily coextensive with the term used in common language. In some cases, as in the canning of beans, peas or other similar items, the beans, peas, etc., are actually cooked, while in the canning of pineapple and other fruits the process provides for the quick application of heat to a point where the micro-organisms, yeasts, molds and spores are killed and the amount of heat thus applied is kept at a minimum so that the general texture of a "cooked" product is avoided as much as possible. In this case the term "sterilizing" might better cover the subject. The term cooking will be adhered to and should be interpreted to mean the application of such heat as may be desirable for sterilizing or cooking purposes, keeping in mind that it may be desirable, for the purposes of economy, when introducing my process in an existing plant, to carry out the sterilization process only partly in the cooker and to finish the sterilization in another cooker.

I claim:

1. In the process of canning pineapple or the like, the steps of subjecting the pineapple to high pressure and heat whereby the pineapple is cooked and air is driven from the cells of the pineapple, of controlling the release of the pineapple from pressure and heat for causing moisture within the pineapple to vaporize with a desired degree of disruptive effect and of immediately syruping the pineapple whereby the syrup is drawn into the cellular structure of the pineapple.

2. The herein described process of removing air from food which consists in subjecting the food in open containers to a high pressure and then in suddenly relieving the pressure for causing the air cells in the food to burst and to liberate the air, and then in immediately filling the containers with a liquid, this liquid filling each container and also filling the bursted cells whereby all of the air is driven out of the container, and then in finally sealing the containers.

3. The herein described process of removing air from food which consists in subjecting the food to a high pressure and then in suddenly relieving the pressure for causing the air cells in the food to burst and to liberate the air, and then in immediately filling the bursted cells with liquid, whereby all of the air is driven out of the food.

ROBERT B. TAYLOR.